March 16, 1937. W. MICKS 2,073,703
METHOD OF MAKING KNITTED FABRIC
Filed May 2, 1935 4 Sheets-Sheet 1
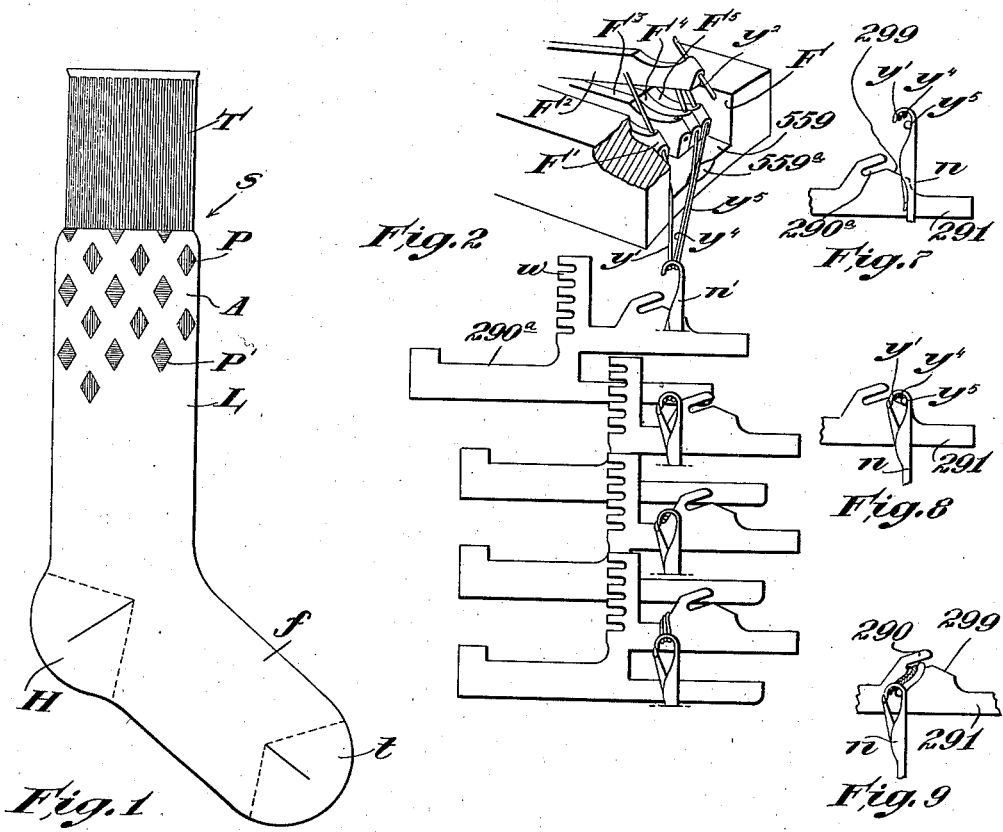
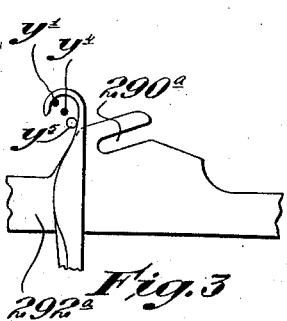
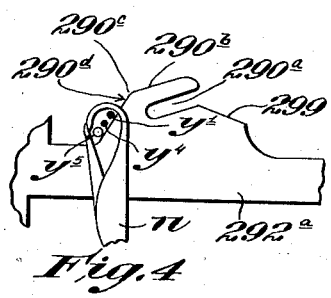
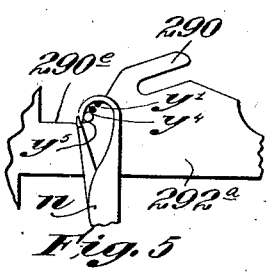
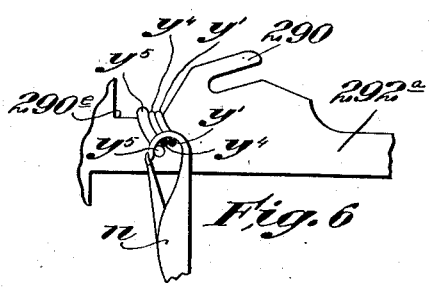
Inventor
Wilmot Micks
by Roberts Cushman & Woodberry
att'ys.

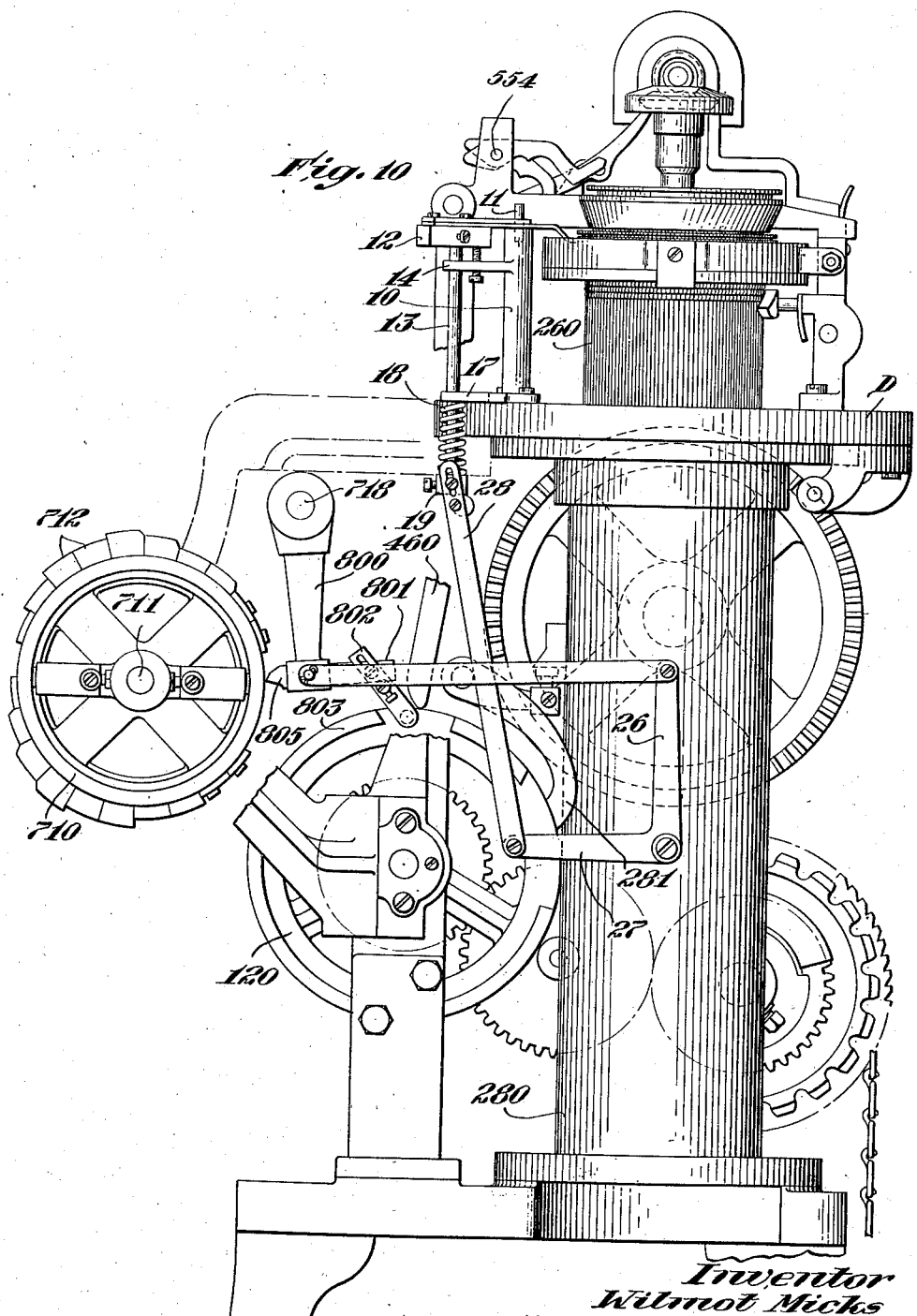

March 16, 1937. W. MICKS 2,073,703
METHOD OF MAKING KNITTED FABRIC
Filed May 2, 1935 4 Sheets-Sheet 3
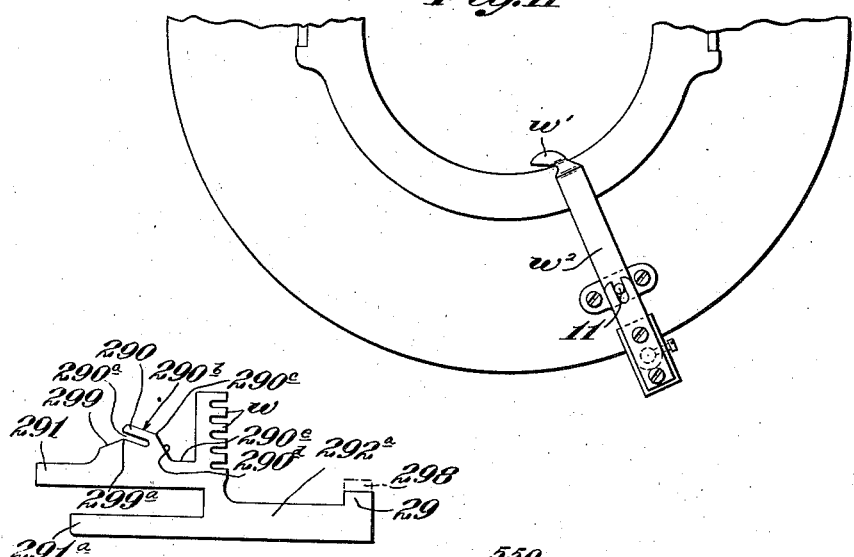
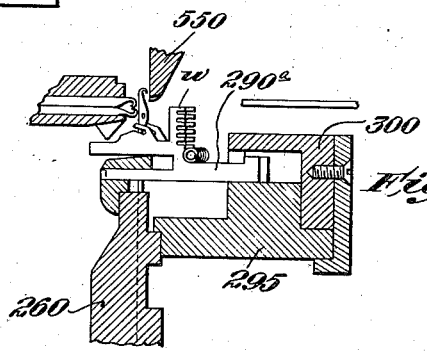
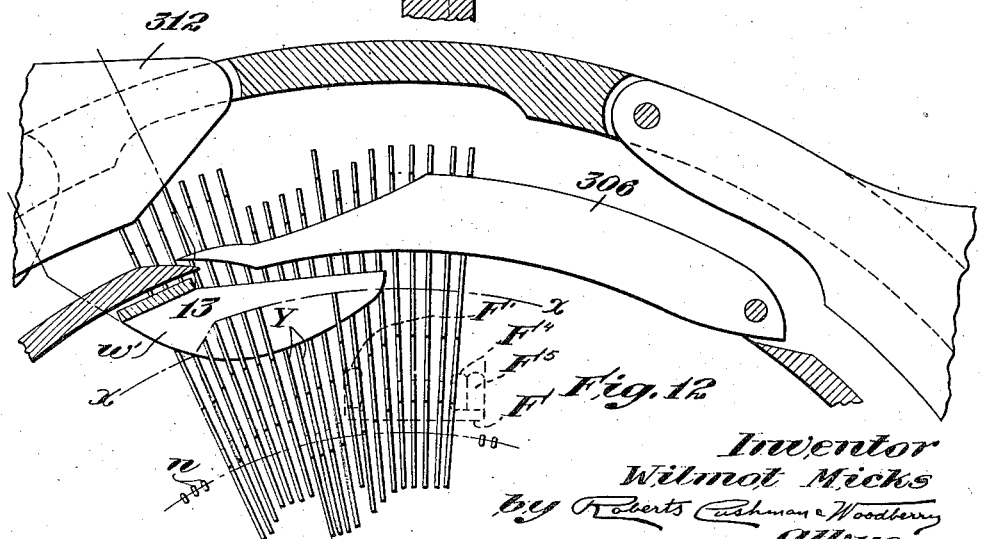
Inventor
Wilmot Micks
By Roberts Cushman & Woodberry
Attys.

March 16, 1937. W. MICKS 2,073,703
METHOD OF MAKING KNITTED FABRIC
Filed May 2, 1935 4 Sheets-Sheet 4
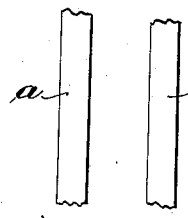
Fig.15
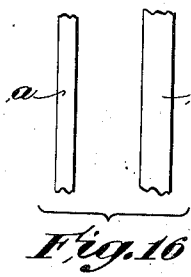
Fig.16
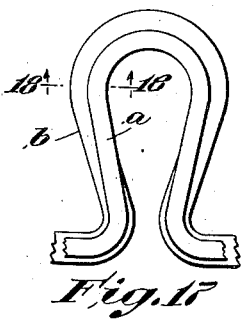
Fig.17
Fig.18
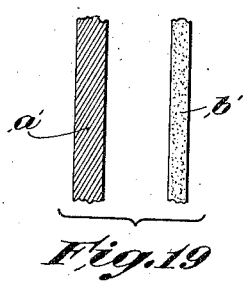
Fig.19
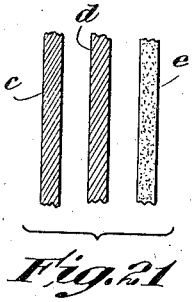
Fig.21
Fig.22
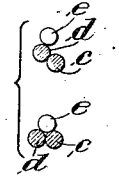
Fig.23
Fig.20
Fig.25
Fig.24
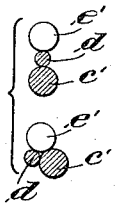
Fig.26
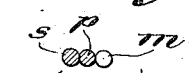
Fig.28
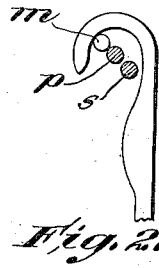
Fig.27
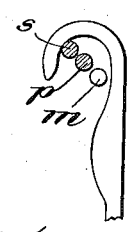
Fig.29
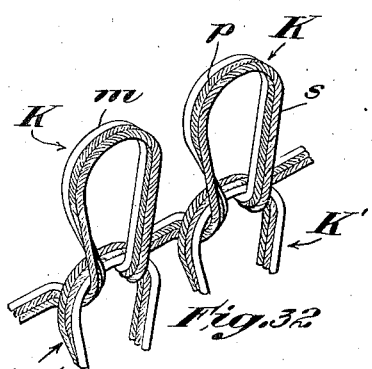
Fig.32
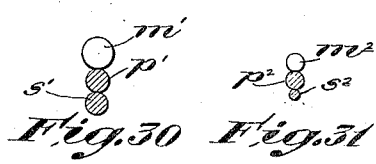
Fig.30 Fig.31
Inventor
Wilmot Micks
by Roberts Cushman Woodberry
Att'ys.

Patented Mar. 16, 1937

2,073,703

UNITED STATES PATENT OFFICE 2,073,703

METHOD OF MAKING KNITTED FABRIC

Wilmot Micks, North Hamilton, Ontario, Canada, assignor to Scott & Williams, Incorporated, New York, N. Y., a corporation of Massachusetts Application May 2, 1935, Serial No. 19,477

11 Claims. (Cl. 66—108)

This invention pertains to knitted fabrics and to a method of making the same, and relates more particularly to multiple-yarn plated fabrics of substantially uniform body or background color at the front and a different color or colors at the rear, and wherein a backing yarn is normally concealed by a facing yarn or yarns. In a more specific development, ornamental effects are obtained by selective reversal of the facing and backing yarns so that at desired intervals the backing yarn, which is of a different color, kind or material from the facing yarn, appears at the front of the fabric to impart its particular characteristics thereto throughout any desired area, for example, a stripe or figuring spot, such stripe or spot appearing upon a background having the characteristics of the normal facing yarn or yarns.

In usual prior practice, the backing and facing yarns have been of substantially the same diameter, and since, for reliably disposing the yarns in plating relation, it is usually considered requisite to apply a greater tension to the facing yarn than to the backing yarn there results a tendency not only to reduce the diameter of the facing or plating yarn relatively to that of the backing yarn, but also to reduce the size of the yarn loop made from the facing or plating yarn as compared with that formed from the backing yarn. As a consequence, the facing yarn does not alway completely cover the body yarn, particularly when the yarns are of sharply contrasting colors, such as may be desirable for pattern effects, and thus the fabric has a mottled, speckled or cloudy appearance and fails to have the uniformity of color demanded by the trade in the highest class of goods. On the other hand, by reason of the relatively small areas of the pattern figures, as compared with the background area, a failure of the figuring yarn completely to cover and conceal the yarn behind it is of comparatively small consequence, since the eye perceives the pattern figure as a whole and does not tend to pick out errors in individual loops as it does where they occur in broad areas of otherwise uniform color. In devising this invention, this fact is taken advantage of as will hereinafter appear.

With the object of avoiding the difficulty mentioned, and after considerable experiment, it has been discovered that unexpectedly improved results may be obtained by employing a facing or plating yarn which is of a coarser count (larger diameter) than the backing yarn. Thus when the facing yarn is tensioned to obtain the desired plating effect, its diameter and loop size, even though slightly reduced by reason of the high tension may still remain at least as great as those of the backing yarn so that a superior covering effect results. For extreme conditions of dissimilarity between the backing and facing yarns, it is desirable to employ a facing yarn of such size or count, relatively to that of the backing yarn, that when knit into the fabric its diameter and loop size will definitely exceed those of the backing yarn.

While improved effects have thus been obtained by the employment of a single, relatively coarse gauge facing yarn as above described, I find that a better and even more reliable covering action may be obtained by using two facing yarns of the same color, instead of a single facing yarn, the combined cross-sectional area of the two facing yarns desirably being at least as great as that of the backing yarn. Preferably facing and backing yarns, each of a gauge coarser than that of the middle yarn, are used. For most effective results the two facing yarns should be interknit in plating relation to each other as well as to the backing yarn. By so disposing the facing yarns, it is possible, if desired, to make one of them, which for convenience may hereafter be referred to as the "middle" yarn, of a cheaper or stronger material than the facing yarn proper, although it is to be observed that both the middle yarn and the facing yarn should be of substantially the same ultimate color in the finished fabric.

While the exact reasons for the improved effects observable by using two facing yarns of relatively small diameter, rather than a single facing yarn of greater diameter, is not altogether certain, it would appear that it may in part be due to the fact that lesser tension is required to be placed upon the outer or facing yarn proper, when a middle yarn is used, than when but a single plating yarn is used, or, perhaps of more importance, the fact that when two facing yarns are introduced, any slippage of such facing yarns from accurate plating relation to the backing yarn will dispose the two facing yarns more or less side-by-side where their combined diameters are effective to screen the backing yarn, whereas when but a single plating or facing yarn of the same size as the backing yarn is employed, transverse slippage of one yarn with reference to the other places the facing and backing yarns substantially side by side so that the backing yarn is exposed. Whatever the exact cause of the improved result, it is a fact that the fabric resulting from the method as herein described is more uniform in appearance than ordinary plated fabric, whether in plain color or whether ornamented by reverse plating or otherwise. When so ornamented, the uniform clear colored body fabric provides the ideal background for pattern effects. Since, as noted, certain advantages of the invention inhere from the use of facing material, whether in a single thick yarn, or a plurality of yarns, the expression "strand material" has herein been employed for conveniently designating either a single yarn or a plurality of yarns functioning for the purpose of concealing the backing yarn in normal loops.

While reference is herein made to the use of a "backing" yarn, it is to be understood that this term is intended in a broad sense and that whenever desired, during the production of the fabric, one backing yarn may be substituted for another, for example, for variation in pattern color, or that the backing yarn may have associated therewith a secondary yarn when desired, for example for reinforcing.

When herein difference in "color" is referred to, it is to be understood that color is to be regarded as merely one example of a distinguishing characteristic, and may be regarded as generically defining any of such distinguishing features as, for example, ability to absorb color in dyeing; tensile strength; material; roughness or smoothness; twist; elasticity; etc.

The improved method is conveniently practiced on a commercial scale by the use of a knitting machine, for example a circular, independent needle machine provided with devices for causing the constituent yarns to be disposed in plated relation in the fabric loops,—desirable results in this respect being attainable by the association of properly shaped sinkers with the needles. Preferably the machine used is of a type designed for reverse plating, and for the convenient attainment of the other desirable features of the present invention, the employment of pattern controlled reverse plating sinkers is recommended, although it is contemplated that other means for effectively and accurately reversing the plating arrangement of the yarns may be employed within the purview of the present invention.

One machine designed for making patterned, sinker-reversed plated fabric of usual type, is described in the patent to Page, No. 1,891,270, and in the following description the improved method will be described with particular reference to the employment of such a machine as that illustrated in the Page patent but somewhat modified, particularly as to the shapes of the sinkers employed.

In the accompanying drawings, in which desirable embodiments of the invention are illustrated by way of example, Fig. 1 is an elevation, to small scale, of a circular knit stocking embodying the present invention;

Fig. 2 is a view, partly in perspective and partly in diagrammatic side elevation, illustrating one preferred method of feeding yarns to be taken by the needles of a knitting machine in accordance with the present invention;

Figs. 3, 4, 5 and 6 are fragmentary views, to large scale, showing a relation of the yarns, needle hooks and sinkers desirably made use of in the practice of the present invention, wherein reverse plating is used for producing figured fabric;

Figs. 7, 8 and 9 are fragmentary diagrammatic elevations showing relations of the yarns, needle hooks and sinkers for making normal ground-work fabric in accordance with the present invention;

Fig. 10 is a side elevation, with certain parts omitted, illustrating a circular knitting machine of a type useful in the practice of the present invention;

Fig. 11 is a detail plan view, to larger scale, of the web holder cam cap of the machine shown in Fig. 10;

Fig. 12 is a diagram, in plan, to larger scale, showing one relation of yarn feed, normal web holder motions, and patterning web holder motions;

Fig. 13 is a typical detail radial section, at the verge of the needle cylinder, of the machine shown in Fig. 10;

Fig. 14 is a side elevation, to large scale, of a web holder or sinker useful in the practice of the present invention;

Figs. 15 and 16 are diagrammatic fragmentary elevations, to large scale, illustrating two yarns such as are normally employed in making plated fabric, before and after, respectively, they are placed under the usual tension for plating;

Fig. 17 is a front elevation of a duplex plated yarn loop consisting of two like threads plated one on the other in accordance with the usual practice;

Fig. 18 is a section on the line 18—18 of Fig. 17;

Fig. 19 is a fragmentary elevation showing a relative diameter of two yarns which may be employed in accordance with the present invention, for producing plated fabric of uniform color;

Fig. 20 is a transverse section through a loop of such fabric employing two yarns related as those of Fig. 19;

Fig. 21 is a fragmentary elevation illustrating three yarns useful in accordance with the present invention in making plated fabric;

Fig. 22 illustrates, in transverse section, two arrangements of three yarns in a plated loop, either of which serves to conceal the backing or body yarn,—the several yarns being of the same diameter;

Fig. 23 illustrates three yarns in plated relation and in two different positions, wherein the facing yarn is of larger diameter than the other two;

Fig. 24 is a view similar to Fig. 23 but showing an arrangement in which the backing and facing yarns are of substantially the same diameter, and larger than the middle yarn;

Fig. 25 is a view generally similar to Fig. 20 but illustrating the use of four yarns of substantially the same diameter in plating relation;

Figs. 26 and 27 are a transverse section through three yarns in normal plating relation and a fragmentary elevation of a needle hook having such yarns disposed within the hook, respectively;

Figs. 28 and 29 are views similar to Figs. 26 and 27 but showing the facing and backing yarns reversed;

Figs. 30 and 31 are diagrammatic cross sections illustrating other combinations of facing, backing and middle yarns, showing how, in each case, if the facing and middle yarns slip, they still cover the backing yarn; and Fig. 32 is a fragmentary perspective view showing a small section of the improved fabric comprising three yarns in plated relation with the facing and backing yarns reversed in certain loops.

A stocking S is shown in Fig. 1 as illustrative of such a patterned fabric as may readily be made in accordance with the present invention, the stocking shown having the rib top T, the leg L, the foot $f$, the heel H and the toe $t$, all of such parts being capable of being knitted in integral continuation upon a circular knitting machine, for example of the general type disclosed in the patent to Page No. 1,891,270 above referred to. As shown, the leg, and if desired the foot, comprises a background A of plain fabric in which only the color of the normal facing yarn appears, and pattern areas of a different color upon this uniformly colored background fabric, such pattern areas, if desired, being of different colors at different parts of the stocking, as indicated at P and $P^1$ respectively. As suggested, such different colored pattern areas, produced by reverse plating, may result from substitution of a backing or figuring yarn of one color for a yarn of another color, the result of such change of yarn being that the back of the fabric, at the unfigured portions, shows horizontal or vertical stripes or both, of different colors, consisting of the exposed bights of the differently colored backing yarns.

Figs. 15 to 18 illustrate the theoretical effect of knitting a pair of yarns $a$ and $b$, by usual methods, in plating relation, with the yarn $a$ so disposed as to appear at the face of the fabric. Ordinarily, the facing yarn is tensioned more than the backing or body yarn in order to ensure its proper plating upon the latter. Thus if, for example, as is usual, the two yarns $a$ and $b$ are originally of the same material and diameter, the more highly tensioned yarn $a$ tends to decrease in diameter, as shown in Fig. 16, and in drawing the stitch also tends to form a smaller loop than the backing yarn, as shown in Fig. 17. The net result is that the yarn $a$ does not properly cover and conceal the backing yarn $b$, and the plated fabric has a cloudy or mottled effect. On the other hand, if in accordance with the present invention the facing yarn $a^1$ (Figs. 19 and 20) be substantially larger or coarser than the backing yarn $b^1$, then when the yarns are assembled in plated relation, the facing yarn will still be of sufficient bulk (Fig. 20) under ordinary circumstances to cover the backing yarn. While such use of two yarns of different diameters for plating represents an improvement over prior plating methods, a preferred embodiment of the invention, as above suggested, involves the use of two or more yarns of the same color plated over a backing or figuring yarn of a different color. Thus, as illustrated in Fig. 22, the yarns $c$ and $d$ are plated relatively to each other and to the backing yarn $e$, and normally conceal the latter. With this combination, even though the facing and middle yarns $c$ and $d$ respectively do not maintain an accurate plating relation to each other or to the backing yarn, but slip laterally, they still completely mask the backing or figuring yarn. Moreover, the introduction of the middle yarn between the facing and backing yarns allows the use of less tension, so that the facing yarn loops are not shortened so much as in the usual plated fabrics and do not tend to turn over when the needle head is pulled through them, as much as is commonly the case in plated material.

In Fig. 22 all three yarns are shown as of the same size, but in Fig. 23 the facing yarn $c^1$ is shown as of greater diameter, for example, twice the diameter of the yarns $d$ and $e$. Thus the facing yarn, in normal plating relation, completely conceals both the middle and backing yarns $d$ and $e$, and if it slips laterally from its proper plating position, the greater bulk of the yarns $c^1$ and $d$ will completely mask the body yarn $e$.

Even if, as show in Fig. 24, the backing yarn $e^1$ is of the same diameter and material (for example, wool) as the facing yarn $c^1$, the middle yarn $d$ being smaller and of a different material (for example, cotton), the backing yarn $e^1$ is effectively concealed by the yarns $d$ and $c^1$.

In Fig. 25 the possibility of using more than three yarns is suggested, the backing yarn $f$ being associated with three yarns $g$ all of the same diameter in plating relation, the yarns $g$ being of a different color from the backing yarn $f$.

The employment of a plurality of yarns of like color, plated over a backing yarn of a different color to produce a uniform ground fabric lends itself to the production of figured material by reversal of the positions of the facing and backing yarn. Thus the yarns $m$, $p$, $s$ are shown in normal relation in Figs. 26 and 27 for making a ground fabric of uniform color, the yarns $s$ being the facing yarn, $p$ being the middle yarn, and $m$ being the backing yarn. In Figs. 28 and 29 the yarns $m$ and $s$ are shown as having been interchanged in position so that the yarn $m$ which normally appears at the back is exposed at the face. While it is obvious that the pattern figure as thus produced may not be of as uniform a color as the background fabric, this is of little consequence since the eye does not so readily perceive slight variations in color in a small area as in an area of extended size, and it is much more important that the background fabric be uniform than that the figuring areas be of exactly uniform color.

In Fig. 30 the normal backing yarn $m^1$ is shown as of a diameter greater than that of the middle yarn $p^1$ and the facing yarn $s^1$ in substantially the ratio 4:3:3, so that the aggregate cross-sectional area of yarns $p^1$ and $s^1$, while greater than that of yarn $m^1$, is not twice as great as the cross-sectional area of the latter.

In Fig. 31 the backing yarn $m^2$ and the middle yarn $p^2$ are of substantially equal diameter, but greater than that of the facing yarn $s^2$.

In Fig. 32 there is illustrated a small piece of fabric embodying the present invention, drawn to large scale and illustrating the use of three yarns in the production of normal background fabric comprising loops $k$, in which the yarn $s$ constitutes the facing yarn, $p$ the middle yarn, and in which the yarn $m$ constitutes the normal backing yarn, the yarns $s$ and $m$ being illustrated as reversed in the loops $k^1$ for the production of a figuring stitch.

As specific examples of useful yarn combinations, it may be stated that apparently the cheapest combination employs yarns in the ratio of 40% facing yarn and 30% each, backing and middle yarns, respectively. Good results have also been obtained using facing and body yarns each of 30/1 wool and a middle yarn of 80/2 cotton (which is the equivalent of 60/1 wool). Another useful combination comprises a 30/1 wool facing yarn, an 80/2 cotton backing yarn, and a 50/1 wool middle yarn.

Equally good results may be obtained by making all of the yarns of equal weight, so far as appearance is concerned, but obviously a saving of cost is effected by making one of the yarns of a smaller diameter than the others.

While ordinarily, the yarns as knitted, will be of approximately the desired relative colors desired in the finished article, it is to be understood that the several yarns may be of such materials, irrespective of color, that by cross-dyeing, or equivalent methods, the contrasting effects may be obtained in the knitted fabric.

To assist in an understanding of the invention, reference is herein made to a machine of the general type disclosed in the patent to Page No. 1,891,270, December 20, 1932, as an example of mechanism of a type suitable for use in the practice of the present invention, and by means of which the novel fabric herein claimed may be prepared, but it is to be understood that the present invention is not dependent for its successful accomplishment upon the use of a machine of the specific type herein illustrated, but that it may well be carried into effect by other apparatus or mechanical means, or even by the use of hand-actuated implements.

Figs. 2, 10, 11, 12 and 13 illustrate in general a machine such as described in the above-named patent to Page, although somewhat modified as hereinafter described to permit its most effective use in the practice of the invention herein claimed.

Referring to the drawings, the machine illustrated comprises the usual needle cylinder 260 mounted for axial, rotary, and reciprocating movements (in respect to a stationary bed plate D) on a bearing at the top of a column 280. The machine may have the usual means (not shown) for driving the cylinder in rotary and reciprocating movements, and the cylinder carries the usual web holder bed 295 (Fig. 13) for the reception of the sinkers or web holders 290$^a$ (hereinafter more fully described), the sinkers or web holders being normally actuated by cam elements in a web holder cam cap 300 (Fig. 13), held against rotation with the needle cylinder 260 and the web holder bed 295 by usual means (not shown). The machine is preferably provided with the usual latch guard ring 550 (Fig. 13) having a throat opening F (Fig. 2) provided with a floor or throat-plate 559, which constitutes a support for the active yarn guide or guides. These guides, as here illustrated, are openings at the free ends of the individually movable yarn guide fingers F$^1$, F$^2$, F$^3$, F$^4$, F$^5$, etc., which are pivotally supported at 554 (Fig. 10) for actuation by thrust bars 460 (for example such as are disclosed in the patent to Scott No. 1,152,850) actuated in predetermined timed relation by cams on the cam drum 120.

The column 280 may as usual be moved vertically with respect to the bed plate D, for the purpose of varying the elevation of the needle cylinder 260 and its attachments with reference to needle-actuating cams carried by a ring (not shown) secured to the bed plate D, thereby to alter the stitch length. The column may thus be moved by means of a lever 281 actuated by cams on the drum 120. The machine also comprises an auxiliary pattern drum 710 on a shaft 711 driven by suitable pawl and ratchet mechanism (not shown) controlled by the primary pattern surface 61, all as set forth in the patent to Page No. 1,920,427, dated August 1, 1933.

Referring now to Figs. 13 and 14, the web holders or sinkers 290$^a$ may be provided with a series of selector butts $w$ adapted to react with the cam finger $w^1$ on a radially placed bar $w^2$ (Fig. 11) mounted for vertical motion in respect to a standard 10 (Fig. 10) having a pin 11 adapted to take into a hole in the bar $w^2$. The bar $w^2$ and cam finger $w^1$ are vertically moved to encounter one or the other of the series of butts $w$ according to the pattern to be knit. Referring to Fig. 12,—when one of the butts $w$ is encountered by cam finger $w^1$, the corresponding web holder is abnormally advanced, as indicated at Y, whereas normally operated web holder butts travel at line $x$—$x$ in relation to the needles $n$. The finger $w^1$ may operate anywhere between the usual wave of withdrawal of the web holders by cams in the cap 300 and the place of feeding the yarns $y^1$, $y^2$, etc. As shown, it is placed between the yarn feed throat F and the advancing phase of the needle $n$ at the stitch cam for circular knitting (not shown).

For rigidity, the bar $w^2$ may be mounted upon a block 12 (Fig. 10) fastened on the top of a vertical rod 13 passing through a bore in a lug 14 of the standard 10. Bar 13 may also have a bearing in a hole in a lug 17 projecting from the standard 10 over the edge of the bed plate D. Beneath the lug 17 is a compression spring 18, reacting against a collar 19, to resist upward motion of the rod 13 and bar $w^2$.

Preferably pattern motions of the bar $w^2$ and finger $w^1$ are derived from the auxiliary pattern surface constituted of cams 712 of different heights corresponding to the number of differently placed butts $w$, such cams being mounted on the auxiliary pattern drum 710. As usual, the cam surface of drum 710 transmits its indications to a depending indicator lever 800, rocking on a fixed stud 718. The lever 800 may have an arm 801 carrying an adjustable follower 802 for a cam 803 formed on the end of the main pattern surface or drum 120, this cam normally holding the parts 800, 801, etc. upwardly out of operative relation to the indications on cam drum 710.

The cam finger $w^1$ must be positioned in respect to the lugs $w$ on the web holders 290$^a$ to react with one or another thereof as desired, it being noted that any one or more of these butts $w$ may be sheared off so that the web holder having the removed butt will not be affected by the position of the cam finger $w^1$ in its plane. However, since the web holder bed partakes of the up and down motion of the needle cylinder, and as this motion is greater than the distance between butts of the series $w$, it is requisite to compensate for this movement of the cylinder in the pattern control of the position of the finger $w^1$. One preferred way of doing this is by means of the lever and linkage arrangement, including the parts 26, 27, 28 and 130, more fully described in the patent to Page No. 1,891,270 above referred to.

In accordance with one aspect of the present invention, it is preferred simultaneously to feed to the needles a backing, body, or figuring yarn, and a relatively larger facing yarn in plating relation and with provision for reverse plating, for example for patterning, or preferably in accordance with another embodiment of the invention, simultaneously to feed a body or backing yarn and two or more plating yarns like each other in color but different in color from the backing yarn, and of an aggregate thickness preferably greater than that of the backing yarn, —all of the yarns being delivered so as to plate in definite order at the needles.

With this object in view, and with particular reference to the last-suggested arrangement, the active yarn guide finger F¹ (Fig. 2) may be considered as delivering the backing yarn $y^1$ into the hook of the needle $n^1$ while the yarn fingers F⁴ and F⁵ deliver a middle and facing yarn $y^4$ and $y^5$, respectively. As shown in Fig. 2, the backing or body yarn $y^1$ is delivered with a short lead and relatively steep slope from a point adjacent to the corner of the throat plate 559, while the yarns $y^4$ and $y^5$ are delivered to the needles with a longer lead and at a lower angle than the yarn $y^1$, and from points on the edge of the throat plate substantially spaced from the point at which the yarn $y^1$ is delivered. Preferably the edge of the throat plate 559 is cut away or recessed slightly at 559ª to form a definite location for the delivery of the yarns $y^4$ and $y^5$, the described relative arrangement of the several yarns being such as in normal knitting to cause all of the yarns to be taken and knitted in a definite order in plating relation. The fabric thus formed has a rear surface characterized by the distinctive color or other appearance of the yarn $y^1$, which is exposed at this side of the fabric, while the face or front of the fabric shows the characteristic color of the facing yarn $y^5$,—the middle yarn $y^4$, which is of the same color as yarn $y^5$, being normally concealed between the yarns $y^1$ and $y^5$.

The present invention contemplates the production of pattern effects, for example vertical colored stripes or definitely configured colored spots upon a background of a different color which is more uniform in appearance than usual plated ground fabric. The figures (stripes, spots, etc.) are preferably produced by a reverse plating operation, and in accordance with a preferred method the sinkers 290ª are relied upon to produce the desired reverse plating effects, although other known methods of reverse plating capable of obtaining the desired results may be resorted to. Further, as above noted, the invention contemplates the production of pattern areas of different colors at different points in the fabric, and to this end it is proposed, as hereinafter more fully described, to change the figuring or backing yarn at intervals. Since in the present instance the backing yarn $y^1$ is also the figuring yarn, it suffices to substitute for the yarn $y^1$ (when a color change is desired) another yarn $y^2$ (carried for example by the yarn guide finger F²),—the yarn $y^2$ being of a color or character different from yarn $y^1$. Such substitution of yarn may be made in well known ways by pattern controlled manipulation of the yarn fingers F¹ and F², but preferably, in order to maintain accuracy of the feeding point for the body, backing, or figuring yarn, the arrangement of yarn fingers disclosed in the patent to Swinglehurst No. 1,938,673 may be resorted to, such arrangement making it possible to deliver either of the yarns $y^1$ or $y^2$ from the same point in the throat plate, and thus in accurate plating relation to the yarns $y^4$ and $y^5$.

To obtain the desired sinker reverse plating effect, it is preferable to employ web holders or sinkers 290ª of substantially the shape illustrated in Fig. 14. Some of the sinkers or web holders 292ª may have short butts 29 and others long butts 298 for the purposes pointed out, for example, in the patent to Scott No. 1,152,850 and for cooperation with the usual withdrawing cam 306, and with advancing cams such as the adjustable cam 312.

For the production of reverse plated patterning stitches at any selected needle of the entire series, it is desirable to make all of the sinkers or web holders 292ª like or functionally equivalent to the sinker 292ª illustrated in Fig. 14 (with the exception of the difference in length of the butts 29 and 298 as above referred to). But when the reverse plating effects are to be confined to certain predetermined needle wales only, then ordinary sinkers or web holders, for example, such as those shown in the patent to Scott No. 1,152,850 may be used, or if pattern controlled variation of stitch length, for example, be desired at the unpatterned areas, then sinkers of the kind disclosed in the patent to Page No. 1,891,270, may be used instead of the sinkers 292ª except at the patterning wales.

The sinkers 292ª which are especially desirable, although not essential to the practice of the present invention, each comprises the lower leg 291ª (Fig. 14) and the upper leg 291. The upper edge of the operative portion of the latter leg slopes upwardly at 299 to the point 299ª, and then slopes downwardly and outwardly to form the bottom or floor of a narrow downwardly and outwardly directed throat 290ª, above which is the nib 290. The top edge 290ᵇ of the nib 290 also slopes downwardly and rearwardly, substantially parallel to the slope of the throat 290ª and then, at the point 290ᶜ, abruptly merges with the steeply sloping outer edge surface 290ᵈ, which may be rectilinear, or if desired may be of downwardly concave contour, terminating at its lower end at the substantially horizontal surface 290ᵉ.

When a web holder or sinker, such as 292ª, is employed in knitting plain, unfigured or background fabric, its selector butts $w$ travel substantially in the path indicated at $x$—$x$ (Fig. 12) in relation to the needles $n$. When thus caused to operate, for example by displacement of the patterning cam finger $w^1$ from the plane of any of the selector butts $w$, or when a butt $w$ in a plane of operation of the finger $w^1$ has been broken off (so that the sinker moves in response to the operation of the usual advancing and retracting cams operating on the butts 298 or 29) the yarns laid in the needle hooks by the operation of the yarn delivery means above described are caused, by the descending needle hook, first to encounter the surface 299 of the sinker, as illustrated in Figs. 7, 8 and 9. The three yarns $y^1$, $y^4$ and $y^5$ are delivered with such relative leads and angles (as above described) as to enter the needle hook in definite plating relation,—the facing yarn $y^5$ being nearest to the back or shank portion of the hook, while the backing or figuring yarn $y^1$ is nearest to the tip of the hook. The inclined surface 299 of the sinker acts as a cam so that as the needle reaches the position of Fig. 8, it presses the yarn $y^5$ firmly against the rear interior surface of the needle hook, and by keeping this yarn in a definite relation to the other yarns as the needle descends to draw the stitch, ensures the continuation of normal plating up to the very needle wale where reverse plating is desired. The inclined throat 290ª, sloping downwardly and outwardly, restores the stitch to substantially the same level at which it is initiated at the inner or lower end of the slope 299, so that the ultimate stitch length is not substantially varied by reason of the upwardly sloping cam surface 299. In normal plating the loop forming sinker is not pushed in to its operative position (at which the bottom of the throat 290ª is opposite to the back of the needle) until the approaching yarns are below the point of the nib 290 (Fig. 8), so that as the needle continues to descend and the sinker moves inwardly to operative position (Fig. 9) the yarn loops enter the throat 290$^a$ and are reliably positioned for accurate determination of the stitch length.

For pattern knitting by reverse plating, selected sinkers 292$^a$ are advanced abnormally early in the stitch forming operation beyond their normal operative position by the action of the pattern actuated cam finger $w^1$ which operates upon the butts $w$. Thus as the needle $n$ receives the yarns $y^1$, $y^4$ and $y^5$ in its hook, the sinker 292$^a$ is advanced from the position of Fig. 3 to that of Fig. 4 before the needle hook passes below the level of the top of the sinker. In consequence, the yarn bights within the needle hook first encounter the sloping surface 290$^b$ along which they slide in response to the downward pull of the needle until they pass the point 290$^c$. The backing yarn $y^1$ first escapes over the edge at 290$^c$,—followed by the middle yarn $y^4$, and lastly by the facing yarn $y^5$, so that eventually the yarns are disposed in the relative arrangement shown in this figure. Continued downward movement of the needle tensions the yarns over the upper edge 290$^e$ of the sinker, but since the facing yarn $y^5$ is first down over the angle 290$^c$ it is pushed outwardly toward the point of the needle hook, followed by the middle yarn $y^4$ and the backing yarn $y^1$, so that ultimately they arrive in the relative positions of Fig. 6, the net result being to reverse the order of the yarns. Thus the yarn $y^1$ now lies against the inner rear surface of the needle hook and plates on the outside of the other yarns, so that the yarn $y^1$ is exposed at the face of the fabric, while the normal facing yarn $y^5$ appears at the rear surface.

By proper selection of the sinkers to be actuated in the manner illustrated in Figs. 3 to 6 inclusive, any desired stitch may be reversely plated so that pattern figures, such as stripes or spots, may be formed at any point in the fabric. Since the body yarn also constitutes the figuring yarn, it is readily possible to vary the color of the figures from point to point on the fabric merely by exchanging one body yarn for another of a different color. Thus by pattern control of the yarn fingers $F^1$ and $F^2$, for example, the yarns $y^1$ and $y^2$ may be exchanged in any usual or desired order, for instance after the formation of a selected number of courses, or at intervals during the formation of a single course, or both.

The method herein disclosed also lends itself to the production of float patterns in plated fabrics, for example, narrow stripes, such as described in the patent to Hirner, No. 1,062,910, May 27, 1913, or the more elaborate float patterns made possible by the use of mechanism such as disclosed in the patent to Page, No. 1,969,853, August 14, 1934. Obviously, by following the method disclosed by Hirner or Page No. 1,969,853, such a three-yarn plated fabric, as hereinabove described, may also be ornamented with patterns of float stitches in which the facing and middle yarns are floated at the rear, and the backing yarn only is knitted into loops to form the desired pattern area.

I claim:

1. Method of knitting multiple-yarn fabric upon a circular, independent needle knitting machine provided with pattern controlled reverse plating sinkers, and a throat plate provided with yarn-changing devices, whereby to form a plain fabric having a background of substantially uniform color and figures in two or more colors upon the background, which comprises delivering to the needles a backing yarn with a short lead from a point adjacent to the corner of the throat plate, simultaneously delivering a pair of yarns substantially alike in color, but of a color different from that of the backing yarn, with a lead and tension substantially greater than that of the backing yarn and from a point in the throat plate substantially removed from the point at which the backing yarn is delivered, so relatively tensioning the several yarns as to cause them to plate normally in a definite relation with the backing yarn at the rear of the fabric,—at predetermined points causing the backing yarn to appear at the front of the fabric by manipulation of the reverse plating sinkers, and at times changing the backing yarn for another of a different color while manipulating the yarns for reverse plating, thereby to produce differently colored figures upon the background fabric.

2. Method of knitting multiple yarn plated fabric upon a knitting machine provided with pattern-controlled reverse plating means and a throat plate provided with yarn-changing devices whereby to form a plain fabric having a background of substantially uniform surface appearance ornamented with figures of contrasting surface appearance, said method comprising as steps delivering to the needles a backing yarn of selected kind with a short lead from a predetermined point in the throat plate, simultaneously delivering a plurality of other yarns, substantially alike but differing in kind from the backing yarn, with a lead and tension substantially greater than that of the backing yarn and from a portion of the throat plate substantially removed from the point at which the backing yarn is delivered, so relatively tensioning the several yarns as to cause them to plate normally in a definite relation, with the backing yarn at the rear of the fabric and completely concealed by the other yarns whether said other yarns remain disposed in exact plated relation or slip so as to lie side by side,—and, at a predetermined point in the operation, causing the backing yarn to appear at the front of the fabric by manipulation of the reverse plating means, thereby to produce pattern figures of contrasting area upon the background fabric.

3. Method of knitting multiple yarn plated fabric upon a knitting machine provided with pattern-controlled reverse plating sinkers, and a throat plate provided with yarn-changing devices whereby to form a plain fabric having a background of substantially uniform surface appearance ornamented with figures of a contrasting appearance, said method comprising as steps delivering to the needles a backing yarn of a predetermined surface appearance from a point adjacent to the corner of the throat plate, simultaneously delivering to the needles a middle yarn and a facing yarn substantially alike but differing in surface appearance from th backing yarn,—the backing, middle and facing yarns being delivered with successively greater leads and tensions, the backing yarn being separated a substantial distance from the more closely spaced middle and facing yarns where the yarns leave the throat plate of the machine, so relatively tensioning the several yarns as to cause them to plate normally in a definite relation, with the backing yarn at the rear of the fabric and completely concealed by the middle and facing yarns whether the latter yarns remain disposed in exact relative plated relation or slip so as to lie side by side, and at predetermined points causing the backing yarn to appear at the front of the fabric by manipulation of the reverse plating sinkers thereby to produce patterning areas.

4. Method of knitting multiple yarn plated fabric upon a circular, independent needle knitting machine provided with pattern-controlled reverse plating instrumentalities, and a throat plate provided with yarn-changing devices whereby to form a plain fabric having a background of substantially uniform color ornamented with figures of a contrasting color, said method comprising as steps delivering to the needles a backing yarn of a predetermined color and diameter from a point adjacent to the corner of the throat plate, simultaneously delivering to the needles a middle yarn and a facing yarn substantially alike in color, but differing in color from and each of a diameter no greater than that of the backing yarn, the backing, middle and facing yarns being delivered with successively larger leads and tensions, the backing yarn being separated a substantial distance from the more closely spaced middle and facing yarns where the yarns leave the throat plate of the machine, so tensioning the several yarns as to cause them to plate normally in a definite relation, with the backing yarn at the rear of the fabric and completely concealed by the middle and facing yarns whether or not the several yarns remain disposed in exact plated relation, and at predetermined points causing the backing yarn to appear at the front of the fabric by manipulation of the reverse plating instrumentalities thereby to produce patterning areas.

5. Method of knitting multiple yarn plated fabric upon an independent needle knitting machine provided with pattern-controlled reverse plating sinkers, and a throat plate provided with yarn-changing devices whereby to form a plain fabric having a background of substantially uniform color ornamented with figures of a contrasting color, said method comprising as steps delivering to the needles a backing yarn of a predetermined color from a point adjacent to the corner of the throat plate, simultaneously delivering to the needles a middle yarn and a facing yarn substantially alike in color but differing in color from the backing yarn, the facing and backing yarns being of substantially equal diameter and the middle yarn being of a diameter substantially one-half that of the facing yarn, the backing, middle and facing yarns being delivered with successively greater leads and tensions, the backing yarn being separated a substantial distance from the more closely spaced middle and spacing yarns where the yarns leave the throat plate of the machine, so relatively tensioning the several yarns as to cause them to plate normally in a definite relation, with the backing yarn at the rear of the fabric and completely concealed by the middle and facing yarns whether or not the several yarns remain disposed in exact plated relation, and at predetermined points causing the backing yarn to appear at the front of the fabric by manipulation of the reverse plating sinkers thereby to produce patterning areas.

6. Method of knitting multiple yarn plated fabric upon a circular, independent needle knitting machine provided with pattern-controlled reverse plating means, and a throat plate provided with yarn-changing devices whereby to form a plain fabric having a background of substantially uniform color ornamented with figures of a contrasting color, said method comprising as steps delivering to the needles a backing yarn of a predetermined color from a predetermined point in the throat plate, simultaneously delivering to the needles a middle yarn and a facing yarn substantially alike in color but differing in color from the backing yarn, the backing yarn being of substantially one-half the diameter of the facing yarn, the backing, middle and facing yarns being delivered with successively larger leads and tensions, the backing yarn being separated a substantial distance from the more closely spaced middle and spacing yarns where the yarns leave the throat plate of the machine, so relatively tensioning the several yarns as to cause them to plate normally in a definite relation, with the backing yarn at the rear of the fabric and completely concealed by the middle and facing yarns whether or not the several yarns remain disposed in exact plated relation, and at predetermined points causing the backing yarn to appear at the front of the fabric by manipulation of the reverse plating means thereby to produce patterning areas.

7. Method of knitting multiple yarn plated fabric upon a knitting machine provided with pattern-controlled reverse plating sinkers, and a throat plate provided with yarn-changing devices whereby to form a plain fabric having a background of substantially uniform surface color ornamented with figures of a contrasting color, said method comprising as steps delivering to the needles a backing yarn of a predetermined color from a predetermined point in the throat plate, simultaneously delivering to the needles a middle and facing yarn, the facing and middle yarns being substantially alike but of a color different from that of the backing yarn, the middle yarn being of substantially the same diameter as the backing yarn and less in diameter than the facing yarn, the backing, middle and facing yarns being delivered with successively longer leads and tensions, the backing yarn being separated a substantial distance from the more closely spaced middle and spacing yarns where the yarns leave the throat plate of the machine, so relatively tensioning the several yarns as to cause them to plate normally in a definite relation, with the backing yarn at the rear of the fabric and completely concealed by the middle and facing yarns whether or not the several yarns remain disposed in exact plated relation, and at predetermined points causing the backing yarn to appear at the front of the fabric by manipulation of the reverse plating sinkers thereby to produce patterning areas.

8. Method of knitting multiple yarn plated fabric upon a circular, independent needle knitting machine provided with pattern-controlled reverse plating sinkers and a throat plate provided with yarn-changing devices whereby to form a plain fabric having a background of substantially uniform surface appearance ornamented with figures of a contrasting appearance, said method comprising as steps delivering to the needles a backing yarn of a selected kind with a short lead from a predetermined part of the throat plate, simultaneously delivering to the needles strand-material comprising a plurality of independent yarns substantially alike in kind but distinctively different in kind from the backing yarn, said strand-material being delivered with a lead and tension greater than that of the backing yarn and from a portion of the throat plate substantially removed from the point to which the backing yarn is delivered, so relatively tensioning the backing yarn and strand-material as to cause them to plate normally in a definite relation, with the backing yarn at the rear of the fabric and completely concealed by the strand-material whether the constituent yarns of the latter remain disposed in exact plated relation or slip so as to lie side by side,—at predetermined points causing the backing yarn to appear at the front of the fabric by manipulation of the reverse plating sinkers, and at times changing the backing yarn for another of a different kind prior to the initiation of reverse plating thereby to produce distinctively different figures upon the background fabric.

9. Method of knitting multiple yarn plated fabric upon a circular knitting machine provided with pattern-controlled reverse plating sinkers and a throat plate provided with yarn-changing devices whereby to form a plain fabric having a background of substantially uniform color ornamented with figures of a contrasting color, said method comprising as steps delivering to the needles a backing yarn of a predetermined color and diameter with a short lead from a point adjacent to the corner of the throat plate, simultaneously delivering a pair of other yarns substantially alike but differing in color from the backing yarn, said pair of yarns being of an aggregate transverse thickness greater than that of the backing yarn, both yarns of said pair being delivered with a lead and tension substantially greater than that of the backing yarn and from a portion of the throat plate substantially removed from the point at which the backing yarn is delivered, so relatively tensioning the several yarns as to cause them to plate normally in a definite relation, with the backing yarn at the rear of the fabric and completely concealed by the other pair of yarns whether the latter remain disposed in exact plated relation or slip so as to lie side by side,—at predetermined points causing the backing yarn to appear at the front of the fabric by manipulation of the reverse plating sinkers, and at times changing the backing yarn for another of a different color prior to the initiation of reverse plating.

10. Method of knitting multiple yarn plated fabric upon an independent needle knitting machine provided with pattern-controlled reverse plating instrumentalities and a throat plate provided with yarn-changing devices whereby to form a plain fabric having a background of substantially uniform surface appearance and ornamented with figures of a different surface appearance, said method comprising as steps delivering to the needles a backing yarn, a middle yarn and a facing yarn, the backing yarn being delivered from a point adjacent to the corner of the throat plate, the backing, middle and facing yarns being delivered with successively increasing leads and tensions respectively, the facing and middle yarns being of substantially the same surface appearance but differing in appearance from the backing yarn, the facing yarn being of greater diameter than the backing yarn, the latter being separated a substantial distance from the more closely spaced middle and facing yarns where the several yarns leave the throat plate of the machine, so relatively tensioning the several yarns as to cause them to plate normally in a definite relation, with the backing yarn at the rear of the fabric and completely concealed by the middle and facing yarns whether the latter yarns remain disposed in exact plated relation or slip so as to lie side by side,—and, at predetermined points in the operation, causing the backing yarn to appear at the front of the fabric by manipulation of the reverse plating instrumentalities thereby to produce patterning figures.

11. Method of knitting multiple yarn plated fabric upon a circular independent needle knitting machine, provided with pattern-controlled reverse plating sinkers and a throat plate provided with yarn-changing devices whereby to form a plain fabric having a background of substantially uniform color with patterning figures of contrasting color upon the background, said method comprising as steps delivering to the needles a backing yarn of a predetermined diameter and color with a short lead from a predetermined point of the throat plate, simultaneously delivering a middle and a facing yarn to the needles with leads and tensions successively greater respectively than that of the backing yarn and from a portion of the throat plate substantially removed from the point at which the backing yarn is delivered, the middle and facing yarns being of an aggregate transverse thickness greater than that of the backing yarn, so relatively tensioning the several yarns as to cause them to plate normally in a definite relation with the backing yarn at the rear of the fabric and completely concealed by the middle and facing yarns whether said latter yarns remain disposed in exact plated relation or slip so as to lie side by side,—at predetermined points causing the backing yarn to appear at the front of the fabric by manipulation of the reverse plating sinkers, and at times changing the backing yarn for another of a different color prior to the initiation of reverse plating thereby to produce differently colored figures upon the background fabric.

WILMOT MICKS.